United States Patent [19]

Bristowe et al.

[11] Patent Number: 4,506,055
[45] Date of Patent: Mar. 19, 1985

[54] CARBOXY MODIFIED VINYL ESTER URETHANE RESINS

[75] Inventors: William W. Bristowe, Wilmington; Ernest C. Ford, Jr., Newark, both of Del.

[73] Assignee: ICI Americas Inc., Wilmington, Del.

[21] Appl. No.: 506,910

[22] Filed: Jun. 23, 1983

[51] Int. Cl.$^3$ .............................................. C08K 3/00
[52] U.S. Cl. ................................... 525/424; 524/433; 524/539; 525/440; 525/455
[58] Field of Search ............... 525/440, 455; 524/424, 524/433, 539

[56] References Cited

U.S. PATENT DOCUMENTS

| | | | |
|---|---|---|---|
| 3,466,259 | 9/1969 | Jernigan | 260/37 |
| 3,548,030 | 12/1970 | Jernigan | 260/836 |
| 3,876,726 | 4/1975 | Ford et al. | 260/859 R |
| 4,182,830 | 1/1980 | Ford, Jr. | 525/440 |
| 4,197,390 | 4/1980 | Jackson | 528/115 |
| 4,213,837 | 7/1980 | Bristowe et al. | 525/440 |
| 4,218,294 | 8/1980 | Brack | 525/533 |
| 4,339,566 | 7/1982 | Rosenkranz et al. | 528/74 |

Primary Examiner—Joseph L. Schofer
Assistant Examiner—Bernard Lipman
Attorney, Agent, or Firm—Richard A. Rowe

[57] ABSTRACT

Carboxy terminated vinylester urethane polymers are useful as a thickening agent for sheet molding compositions when reacted with metal oxide which comprises a compound having the general formula:

$$B-I[A-M-A-M]_n-CO_2H$$

wherein
B is a radical derived from a hydroxyl-terminated ester of acrylic or methacrylic acid;
I is a radical derived from an aromatic polyisocyanate;
A is a radical derived from polyoxyalkylene bisphenol A or derivative thereof;
M is a radical derived from a dicarboxylic acid or anhydride thereof;
n is an integer equal to from 1 to about 10.

The polymer is employed as a thickening agent in systems containing vinylmonomer and other ethylenically unsaturated resins.

9 Claims, No Drawings

CARBOXY MODIFIED VINYL ESTER URETHANE RESINS

BACKGROUND OF THE INVENTION

1. Field of the Invention

The present invention relates generally to carboxy modified vinyl ester urethane resins, to methods of preparing said resins and to compositions containing said resins. More particularly the invention relates to carboxy modified vinyl ester urethane resins having the following general formula:

$$B—I[A—M—A—M]_n—CO_2H$$

wherein
- A is a radical derived from a polyoxyalkylene bisphenol A;
- M is a radical derived from a dicarboxylic acid or an anhydride thereof;
- I is a radical derived from an isocyanate having an isocyanate functionality of at least 2;
- B is a radical derived from a hydroxyl-terminated ester of acrylic or methacrylic acid; and
- n is an integer equal to from 1 to about 10.

The resins may be prepared in addition to other methods by reacting a polyisocyanate and a hydroxyl-terminated ester of acrylic or methacrylic acid with the condensation product prepared by reacting a polyoxyalkylene bisphenol A with a dicarboxylic acid, anhydride or mixtures thereof. The resins are particularly useful in sheet molding compounds made by reaction with magnesium oxide as thickening agent when blended with unsaturated monomer, unsaturated resin, low profile agents, fillers and reinforcing agents.

2. Description of the Prior Art

Noncarboxy modified vinyl ester urethane resins are known and disclosed in U.S. Pat. No. 3,876,726. Thermosetting vinyl ester resin compositions which contain reactive carboxylic acid groups are also known and disclosed in U.S. Pat. No. 3,466,259. Other vinyl ester resins containing reactive carboxylic acid groups are disclosed in U.S. Pat. No. 3,548,030 and U.S. Pat. No. 4,197,390. However, none of the prior art resins disclosed resemble those of the instant invention. Additionally, it has been surprisingly discovered that the carboxy modified resins of the present invention provide for superior properties of compositions containing magnesium oxide.

SUMMARY OF THE INVENTION

In accordance with the present invention, carboxy modified vinyl ester urethane resins are prepared having the following general formula:

$$B—I[A—M—A—M]_n—CO_2H$$

wherein
- A is a radical derived from a polyoxyalkylene bisphenol A;
- M is a radical derived from a dicarboxylic acid or an anhydride thereof;
- I is a radical derived from an isocyanate having an isocyanate functionality of at least 2;
- B is a radical derived from a hydroxyl-terminated ester of acrylic or methacrylic acid; and
- n is an integer equal to from 1 to about 10.

DESCRIPTION OF THE PREFERRED EMBODIMENTS

The carboxy modified vinyl ester urethane resins of the above general formula are generally prepared from a polyoxyalkylene bisphenol A maleate or fumarate although saturated equivalents also work, a polyisocyanate having an isocyanate functionality of about 2–3 and a hydroxyl-terminated ester of acrylic or methacrylic acid. Each of the components which may be employed in the preparation of the resins of the present invention is described in detail below.

The carboxy modified urethane resin of the invention may be synthesized by several techniques. One method as described in the examples involves preparing a short chain dihydroxy terminated polyester prepared by first reacting a bisphenol A diol with a dicarboxylic acid or anhydride in molar preportions of 3/2. One terminal hydroxyl group is reacted with an equimolar amount of unsaturated diacid or anhydride to form a short chain polyester having an average of one hydroxyl and one carboxyl group per molecule. The molecular weight of these polyester intermediates range from 600–8000 and preferably from about 1500 to 3000. It is not required to make the polyester oligomer by this technique since it is within the skill of the art to condense all the diol and dicarboxylic acid or dianhydride under approximate control to arrive at an equivalent product. The condensation may be carried out neat or in an appropriate solvent such as an unsaturated monomer such as styrene especially when the carboxy modified resin is to be ultimately polymerized with such monomer.

The above polyester oligomers may be reacted with equivalent amounts of polyisocyanate and hydroxy ester of acrylic or methacrylic acid such that the mol ratio of total hydroxyl groups to isocyanate groups ranges from 0.95–1.1. It is preferred to have no unreacted isocyanate remaining in the resin. The reaction may be carried out in solvent or neat. Polyisocyanate may first be reacted with either the hydroxyl terminated oligomer or the hydroxy acrylic ester such that at least one unreacted or the hydroxy acrylic ester such that at least one unreacted isocyanate per molecule remains and thereafter combined with the remaining hydroxyl containing moiety. Alternatively as shown in the examples the isocyanate may be added to a solvent mixture of the hydroxyl containing moieties.

Another approach to synthesis involves adding polyisocyanate to a solvent solution of stoichiometric amounts of dihydroxy terminated oligomer polyester and hydroxyl acrylic ester such that the total hydroxyl group/isocyanate mol ratio is at least 3/2 and that at least one unreacted hydroxyl group per molecule remains. To this composition is added one mol of diacid per equivalent of unreacted hydroxyl. Final products having an acid number in the range of 17–33 are most suitable for use with metal oxide thickening agents when intended for sheet molding compounds.

In carrying out the urethane reaction it is sometimes preferred to use a catalyst to promote the reaction between hydroxyl and isocyanate. Such catalysts are well known and include organic amine and organo metallic compounds such as dibutyltin dilaurate and triethylenediamine.

Bisphenol A Derivative

The bisphenol A derivative employed in the preparation of the vinyl ester urethane resins of the present invention may be described as a condensate of bisphenol A and an alkyleneoxide such as ethylene oxide or propylene oxide.

As is well known to those skilled in the art, bisphenol A refers to the following compound:

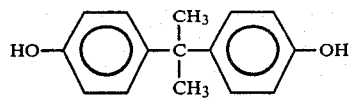

In addition to this material, substituted derivatives of bisphenol A may also be utilized in preparing the resins of the present invention. If substituted derivatives are employed, it is preferred to utilize those having the following general formula:

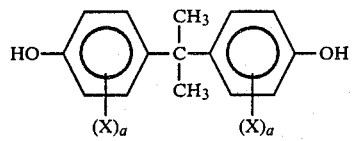

wherein X is selected from the group consisting of halogen and methyl and a is an integer equal to 1 or 2. Especially preferred bisphenol A derivatives are those represented by the above general formula wherein X is selected from the group consisting of chlorine, bromine, and fluorine.

The polyoxyalkylene derivatives of the bisphenol A are prepared by reacting the bisphenol A with an alkylene oxide. Suitable alkylene oxides which may be employed include, for example, ethylene oxide, propylene oxide or butylene oxide. The preferred polyoxyalkylene derivatives of bisphenol A useful in the present invention may be represented by the following general formula:

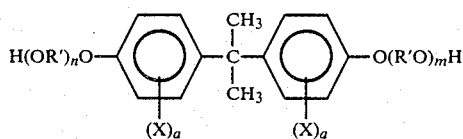

wherein
R' is an alkylene group having 2-4 carbon atoms,
X is halogen or methyl,
a is an integer equal to from 0 to 2, and
m and n are integers each of which is equal to at least 1 and the sum of which is equal to from about 2 to about 16.

The sum of m and n in the above formula is determined by the number of mols of alkylene oxide reacted with each mol of bisphenol A. Thus, in preparing the polyoxyalkylene derivatives of bisphenol A useful in the present invention, at least 2 mols of alkylene oxide should be reacted with each mol of bisphenol A. Preferred results are achieved when the number of mols of alkylene oxide utilized—i.e., the sum of m and n in the above formula—is equal to from about 2 to about 16. It has been found that, as the amount of alkylene oxide employed is increased, the properties of the resins change and certain of said properties such as flexural strength and elongation improve but, at the same time, other properties such as glass transition temperature and tensile strength decrease. It is, therefore, necessary to select the amount of alkylene oxide employed to achieve a resin having the desired properties. It should be noted that, although resins can be prepared from bisphenol A derivatives wherein the sum of m and n is equal to greater than about 8, these resins are extremely soft and are, therefore, not within the preferred materials of the present invention. Especially preferred results are achieved with derivatives in which the sum of m and n is equal to from 2 to about 4.

In the especially preferred polyoxyalkylene bisphenol A derivatives, R' in the above formula is an alkylene group containing from 2 to 3 carbon atoms.

The bisphenol A polyester oligomers useful in the preparation of vinyl ester urethane resins in accordance with the present invention are prepared by reacting the polyoxyalkylene bisphenol A derivatives described above with a dicarboxylic acid or an anhydride thereof. Unsaturated dicarboxylic acids which may be employed in preparing derivatives useful in the present invention include, for example, maleic acid and fumaric acid. Anhydrides which may also be utilized include maleic anhydride.

In addition while it is preferred to have unsaturated dibasic acids as the preferred substituent of the bisphenol A polyester oligomer, the saturated dibasic acids or mixtures of saturated dibasic acids with unsaturated dibasic acids may be used. Some saturated dibasic acids are azelaic, sebacic, etc or orthophthalac, isophthalic, and terephthalic. The reduction in crosslink density by this method has a tendency to reduce resin shrinkage on cure and effect a better low profile surface.

The concentration of reactants has to satisfy two requirements. The first requirement is that the balance of hydroxyl equivalents employed and isocyanate equivalents employed are equal having the provision that the OH/NCO ratio is from 0.90 to 1.1. The second requirement is that the final product including solvent have an acid number of from 17 to 33.

Ester of Acrylic or Methacrylic Acid

The hydroxyl-terminated ester of acrylic or methacrylic acid which may be employed in accordance with the present invention has the following general formula:

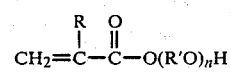

wherein
R is hydrogen or methyl, ethyl, propyl, butyl, etc.,
R' is an alkylene group containing 2-4 carbon atoms, and
n is an integer equal to from 1 to about 3.

These materials are prepared by reacting acrylic acid or methacrylic acid or suitable substituted acrylic acid with an alkylene oxide selected from the group consisting of ethylene oxide and propylene oxide. The reaction is carried out by methods which are well known in the art. The integer n in the above formula is determined by the mols of alkylene oxide employed per mol of acrylic or methacrylic acid. In accordance with the present invention, it has been found that the desired vinyl ester urethane resins are prepared only from materials wherein this number has a value equal to from at least 1 to about 3. If more than about 3 mols of alkylene oxide are employed, the resulting resins have a lower heat distortion temperature and reduced physical properties such as tensile strength and flexural strength. Also, as the value of n is increased, the corrosion resistance of the resulting resins has been found to decrease and it is, therefore, desirable to maintain this value as low as possible. Preferred results have been achieved with resins in which this value of n was equal to from 1 to about 2.

Representative materials which may be employed include, for example, hydroxyl propyl methacrylate, hydroxy ethyl methacrylate, hydroxy ethyl acrylate, hydroxy propyl acrylate, polyoxyethylene(2)acrylate, polyoxyethylene(2)methacrylate, polyoxyethylene(3)acrylate, polyoxyethylene(3)methacrylate, polyoxypropylene(2)acrylate, polyoxypropylene(2)methacrylate, polyoxypropylene(3)acrylate, and polyoxypropylene(3)methacrylate.

The acrylate or methacrylate may be employed either as a single compound or as a mixture of two or more compounds. Preferred results are achieved with hydroxy propyl methacrylate.

The concentration of reactants has to satisfy two requirements. The first requirement is that the balance of hydroxyl equivalents employed and isocyanate equivalents employed are equal having the provision that the OH/NCO ratio is from 0.90 to 1.1. The second requirement is that the final product including solvent have an acid number of from 17 to 33.

The concentration of reactants may be initially set up as follows: The hydroxyl functionality of the polyester oligomer must be calculated or experimentally determined. In the process where a polyester diol is reacted with maleic anhydride the hydroxyl functionality is reduced accordingly. Thus a polyester diol having 2 equivalents of hydroxyl reacted with 0.7 equivalents of maleic anhydride upon reacting leave 1.3 equivalents of hydroxyl functionality. The acid number is measurable or calculatable.

This acid modified polyester polyol is now formulated so that the numerical equivalents of hydroxyl employed from this diol are reacted with the same number of moles of isocyanate. For instance if the 1.3 equivalent weight product described above is reacted with toluene diisocyanate (TDI), 1.3 mols of TDI are used. Considering this isocyanate has two equivalents of NCO per mol then 1.3 equivalents of hydroxyl from the vinyl alcohol will be required.

Using the same acid modified polyester polyol (1.3 equivalent) and reacting it with a polyphenylenepolyisocyanate with a functionality of 3.0 isocyanates would require 1.3 mols of this isocyanate and 2.6 equivalents of hydroxyl from the vinyl alcohol. Polymeric isocyanates are calculated on the basis of equivalents since no single molecular weight species is present.

The acid number is calculated by a dilution technique based on the original acid number of the acid modified polyester polyol considering the total weight of reactants and solvent to be used.

Polyisocyanate

The preferred polyisocyanates used in the invention are aromatic derivatives which are liquids at room temperatures. Such materials are readily commercially available such as the isomers of toluenediisocyanate (TDI), diphenylmethane diisocyanate (MDI) and methylene bridged polyphenylmethane polyisocyanates. Many of the polyphenyl polymethylene polyisocyanates which are prepared by aniline formaldehyde condensations followed by phosgenation ("crude MDI") and poly-isocyanates which contain carbodiimide groups, uretonimine groups, urethane groups, sulfonate groups, isocyanurate groups, urea groups or biuret groups and derivatives thereof containing minor amounts of pre-reacted low molecular weight polyols such as ethylene glycol and propylene glycol or hydroxy esters to form stable liquids are useful. Such combinations are readily available and well known in the urethane manufacturing art. Included are compositions containing the 2,4' and 4,4' diphenylmethane diisocyanate isomers which are quasi prepolymers containing about 10 weight % or about 0.1–0.3 mol percent of low molecular weight polyols such as propylene glycol, butylene, ethylene glycol and poly-1,2-propylene ether glycols having a molecular weight of from 134 to 700. Of additional interest to the invention are carbodiimide, uretonimine modified derivatives of diphenylmethane diisocyanates which have been further modified by the addition of low molecular weight polyols such as ethylene glycol and poly-1,2-propylene ether glycols having a molecular weight of 134 to 700.

The resulting vinyl ester urethane resins have been found to be especially useful in compositions wherein they are combined with 10–80% by weight of an ethylenically unsaturated monomer in which they are soluble. As mentioned above, it is possible by including the vinyl monomer in the reaction mixture to prepare these compositions directly. Alternatively, the vinyl ester urethane may be dissolved in a suitable vinyl monomer prior to use. Suitable vinyl monomers which may be employed in preparing compositions comprising the vinyl ester urethane resins are well known in the art and include, for example, styrene, chlorostyrene, t-butyl styrene, divinyl benzene, vinyl toluene, vinyl acetate, vinyl propionate, acrylic and methacrylic acid esters, diallyl phthalate, diallyl fumarate, and triallyl cyanurate. Of these, it is preferred to employ styrene or chlorostyrene or the esters of acrylic or methacrylic acids.

The amount of monomer employed in these compositions can be varied over a wide range depending upon the intended use of the composition. In addition to the vinyl ester urethane resin and monomer, the compositions of the present invention may also include any of those additives which are conventionally employed in the preparation of such compositions. These include, for example, free radical initiators to accelerate the cross-linking reaction which occurs when the composition is cured; antioxidants to control premature curing, pigments to add color to the cured product; fire-retardant additives; fibers, such as glass and polypropylene, polyimide, graphite to improve the strength and modulus of products prepared from said compositions; fillers, such as antimony oxide, silicon oxides, magnesium oxide, and boron oxides, to alter the physical properties of said products and mold release agents.

Thickening Agents

Sheet molding compositions are made with the carboxy modified resin of the invention by adding carboxy reactive metal oxide and hydroxides such as magnesium oxide, calcium oxide, magnesium hydroxide, calcium hydroxide and basic magnesium carbonate. For any particular blend the appropriate amount of thickener is determined by experiment and amounts as low as 0.5% base on the total weight of the carboxyl modified resin are effective. In some instances at least one mol of magnesium oxide for each two mols of carboxy equivalents are most effective. Depending upon the synthesis history of the carboxyl resins it may be necessary to add a minor amount of water from 0.2–1% by weight along with the thickening agent to act as catalyst. In cases where water is formed as a by-product in the polyester condensation no water may be required.

Additional Resin Systems

The above described carboxy terminated polyurethane/vinyl monomer systems may be used as thickener when combined with other ethylenically unsaturated resins in amounts from 5% up to about 60% by weight prior to the addition of thickening agents, fillers, etc. in the formation of a sheet molding compound.

Ethylenically unsaturated resins which are useful are well known in the art and are prepared by reacting carboxylic acids or their anhydrides with polyhydric alcohols. These have molecular weights ranging from 400–4000 and often 1000–3000. They are prepared using a procedure wherein at least one of the reactive components contains alpha,beta-ethylenic unsaturation. These resins while primarily linear can contain branch chains by the addition of polyols or polycarboxylic acids having more than two functional groups. Usually they contain a plurality of ethylenically unsaturated linkages distributed along the backbones of their polymer chains. The use of alpha,beta-ethylenically unsaturated polycarboxylic acids combines a convenient method of introducing ethylenic unsaturation into the polyester resin. It is preferred to employ alpha,beta-ethylenically unsaturated dicarboxylic acids such as maleic, fumaric, citraconic, gammic, gamma-dimethyl citraconic, mezaconic, itaconic, alpha methyl itaconic, gamma-methyl itaconic, tetraconic, and the like as well as mixtures thereof, but minor amounts of alpha,beta-ethylenically unsaturated polycarboxylic acids containing three or more carboxylic groups such as aconitic acid and the like together with the dicarboxylic acids are also useful.

Whenever available, the anhydrides of any of the aforementioned alpha,beta-ethylenically unsaturated polycarboxylic acids may be substituted for the acid. In addition, suitable saturated acids or their anhydride when available which may also be incorporated along with the unsaturated polyesters include, for example, phthalic acid or anhydride, isophthalic acid, terephthalic acid, tetrabromophthalic acid, tetrachlorophthalic acid, adipic acid, sebacic acid, glutaric acid, or pamelic acid or mixtures thereof. Of particular interest may be mentioned a mixture of isophthalic or orthophthalic acid and fumaric/maleic acids.

Any of a large number of ethylenically unsaturated or saturated polyhydric alcohols may be employed with any of the above suitable mixtures. Dihydric alcohols and especially saturated aliphatic diols are preferred as coreactants in the preparation of polyester resins. Among the dihydric alcohols which may be employed are saturated aliphatic diols such as ethylene glycol, propylene glycol, butylene glycol, diethylene glycol, dipropylene glycol, triethylene glycol, tetraethylene glycol, butane diol, pentane diol, hexane diol, neopentyl glycol and the like as well as mixtures thereof. Among the polyols having more than two hydroxyl groups which may be employed in minor amounts to form branch chains are saturated aliphatic polyols such as glycerol, trimethylolethane, trimethylolpropane, pentaerythritol, arabitol, xylitol, delcitol, donnitol, sorbitol, mannitol and the like as well as mixtures thereof. In addition, aliphatic aromatic diols and polyols may be employed as well as halogenated and alkoxylated derivatives thereof.

In most instances, the condensation products contain unreacted carboxylic acid or hydroxyl groups at the ends of the chain branches. In the present invention the active hydrogens remaining on the hydroxyl or carboxylic acid group may be removed by neutralization with monohydroxy or monocarboxylic acid materials, but such precautions are not considered necessary to prevent cross-linking to the thickener chain.

Other ethylenically unsaturated materials may be added along with the polyester resins such as vinyl ester urethane resins as disclosed in U.S. Pat. Nos. 3,876,726; 3,297,745; 3,371,056; 3,509,234; 3,641,199; 3,642,943; and 3,677,920, to name a few. These polyurethanes must be substantially free of unreacted —NCO groups as to preclude the formation of urylene cross-links.

The ethylenically unsaturated polyester may also include typical ethylenically polyepoxy condensation products which are condensation polyethers produced as, for example, those formed from epichlorohydrin and diols such as bisphenol A, and their ethylenically unsaturated condensation products. Epoxidized polybutadienes are also useful.

The ethylenically unsaturated polymer material may also contain polyisocyanurates such as poly(1,3,5-tri-R substituted S-triazine-2,4,6 trione) wherein the R group may contain ethylenic unsaturation or groups reactive with ethylenically unsaturated materials. R groups may also be linked with epoxy, polyurethane and polyester resins. Such isocyanurates are represented by U.S. Pat. Nos. 2,952,665; 3,041,313; 3,821,098; 3,850,770; 3,719,638; 3,437,500; 3,947,736; and 3,762,269.

In addition to the above described may be included varying amounts of a resin known in the art as "low profile resins" such as polyvinyl acetate and polycoprolactone resins produced by Union Carbide under the code of LP-40, LP-90, LP-60; polymethylmethacrylate produced by Rohm & Haas; Solprene ® by Phillips Pet; cellulose acetate butyrate by Eastman and CDB rubber by Exxon.

These compositions are particularly useful in the preparation of castings, laminates, composites, and filaments.

The solid vinyl ester urethane resins are also useful in, for example, moldings and castings.

The vinyl ester urethane resins of the present invention are characterized by their improved properties especially when compared with the previously available vinyl urethane resins. The resins of the present invention exhibit increased heat distortion temperatures, excellent corrosion resistance especially when exposed to hypochlorite solutions, and are useful in compositions which are faster curing and require lesser amounts of catalyst.

An additional advantage of the resins of the present invention is the unexpectedly low peak temperature—i.e., exotherm—reached during the curing of said resins. This lower peak temperature allows for easier fabrication and makes possible the preparation of thicker laminates having uniform properties. Also, products prepared from these resins exhibit less crazing, cracking, bubbling, warpage, and delamination.

It has also been found that the properties of the vinyl ester urethane resins of the present invention may be varied depending upon the value of y in the above-identified formula. Thus, it is possible to prepare a series of resins the properties of which are varied over a considerable range depending upon the ultimate use of the resin.

Finally, the vinyl ester urethanes may be prepared as solid materials making them particularly useful for a variety of applications.

In order to describe the present invention so that it may be more clearly understood, the following examples are set forth. These examples are given primarily for the purpose of illustration and any enumeration of detail contained therein should not be interpreted as a limitation on the concept of the present invention. All proportions referred to are based on weight unless otherwise specified.

In the examples, the following standard tests, procedures, and components were employed:

Castings were prepared by pouring the resin-containing composition into a mold comprising two glass plates, each of which had previously been coated with a mold release agent, spaced ⅛ inch apart, and sealed together on three edges. After the composition was poured into the mold, the fourth edge was sealed and the composition was allowed to cure at room temperature for 24 hours. At the end of this time, the composition was postcured by heating in an oven at 100° C. for 4 hours after which it was cooled, removed from the mold, and tested.

Laminates were prepared by impregnating a fiberglass mat with the resin-containing composition. The procedure employed was as follows:

a. A sheet of polyethylene terephthalate film was placed on a flat surface and coated with a layer of the resin composition.

b. A continuous fiberglass mat was placed on this layer, pressed into intimate contact therewith, and coated with a layer of the resin composition.

c. A chopped fiberglass mat was placed on this layer, pressed into intimate contact therewith, and coated with a layer of the resin composition.

d. Similarly, a second chopped fiberglass mat, another continuous fiberglass mat, and a second sheet of polyethylene terephthalate film were added separated by layers of the resin-containing composition.

The resulting article was allowed to cure at room temperature for 24 hours. At the end of this time, it was postcured by heating in an oven at 100° C. for 4 hours. The polyethylene terephthalate films were removed and the physical properties of the laminate measured.

Cure properties—i.e., gel time, gel to peak time, and peak temperature—were measured in accordance with the following procedure:

100 grams of the resin-containing composition and catalyst were added to an 8-oz. jar and the mixture was stirred. The time interval between the addition of the catalyst and the point at which the free-flowing resin solution became stringy, as evidenced by the appearance of gelly-like masses, was recorded as "Gel Time." At this point, a thermocouple hooked to a recorder was inserted into the center of the composition to a point about one-half inch from the bottom of the jar. The interval between the gel time and the time at which the maximum exotherm temperature was reached is referred to as "Gel to Peak Time." The maximum exotherm temperature is referred to as "Peak Temperature."

Tensile strength was measured in accordance with A.S.T.M. Standard D-638-71a.

Flexural strength was measured in accordance with A.S.T.M. Standard D-790-71.

Barcol Hardness was determined in accordance with A.S.T.M. Standard D-2583-67.

Elongation was measured in accordance with A.S.T.M. Standard D-638-71a.

Heat distortion temperature (HDT) was measured in accordance with A.S.T.M. Standard D-648-72.

Charpy impact and Izod impact were determined in accordance with A.S.T.M. Standard D-256.

The acid number AN of the resin refers to the number of milligrams of potassium hydroxide required to neutralize one gram of the resin.

The percent free NCO was determined by titration employing the method described in Union Carbide Bulletin F-41146 entitled "Urethane Coatings Chemicals" at page 24.

The saponification number SAP refers to the number of milligrams of potassium hydroxide required to saponify one gram of the resin.

The hydroxyl number OH refers to the number of milligrams of potassium hydroxide required to titrate the unreacted acetic acid from an acetic anhydride acetylation reaction of one gram of sample.

The hydroxypropyl methacrylate employed had a purity of 96 percent by weight.

IONOL refers to an antioxidant identified as 2,6-ditertbutyl-4-methyl phenol available from Shell Chemical Company.

The invention is further illustrated by the following examples.

PREPARATION A

Into a two liter reaction flask equipped with a stirrer, thermometer, nitrogen inlet tube and distillation head, there were added 1318 g (3.72 mols) of polyoxypropylene Bisphenol A containing an average of 2.2 mols of propylene oxide per mol of Bisphenol A and 182 g (186 mols) of maleic anhydride. The resulting mixture was heated at 210°–215° C. for 5 hours. At this point the acid number had dropped to 11. Vacuum was then applied to the reaction mixture for 1 hour while maintaining the temperature at 210°–215° C. After releasing vacuum, 0.75 g of hydroquinone was added. The acid number was found to be 7. The resulting hydroxy terminated polyester oligomer was cooled to 140° C. and 164 g (1.67 mols) of maleic anhydride added. The temperature dropped to 126° C. and was held for ½ hour.

The final product analyzed AN=67, SAP=240 and OH=96.

EXAMPLE 1

Into a two liter reaction flask equipped with a stirrer, thermometer, dry air inlet tube and distillation head were charged 633 g (0.7 mols) of the above hydroxy terminated polyester oligomer of Preparation A. The temperature was raised to 88° C. and 282 g styrene added. 211 g (1.37 mols) of 94% hydroxypropyl methacrylate were then added the temperature dropping off to 58° C. Over a period of 1 hour, 283 g (0.79 mols) of diphenyl methane diisocyanate Rubinate ® M were added dropwise. The exothermic urethane reaction raised the temperature to 78° C. The temperature was raised to 80°–85° C. and held for 4 hours at which point no detectable amount of free NCO by I.R. analysis was present. 100 ppm of phenothiazine were added followed by 470 g of styrene to yield a resin 60% solids in styrene. The resin-styrene solution had a viscosity of 1200 centipoises (#2 @12) at room temperature. Analysis of the resin-styrene solution gave AN=25, SAP=135 and OH=21.

PREPARATION B

Into a two liter reaction flask equipped with a stirrer, thermometer, nitrogen inlet tube and distillation head, there were added 1267 g (3.58 mols) of polyoxypropylene Bisphenol A containing an average of 2.2 mols of propylene oxide per mol of Bisphenol A and 175 g (1.79 mols) of maleic anhydride. The resulting mixture was heated at 210°-215° C. for 5 hours. At this point the acid number had dropped to 10. Vacuum was then applied to the reaction mixture for 1 hour while maintaining the temperature at 210°-215° C. After releasing vacuum, 0.76 g of hydroquinone were added. The acid number was found to be 7. The resulting hydroxy terminated polyester oligomer was cooled to 140° C. and 123 g (1.26 mols) of maleic anhydride added. The temperature dropped to 127° C. and was held for ½ hour.

The final product analyzed AN=54, SAP=221 and OH=106.

EXAMPLE 2

Into a two liter reaction flask equipped with a stirrer, thermometer, dry air inlet tube and distillation head were charged 579 g (0.44 mols) of the hydroxy terminated oligomer described in Preparation B. The temperature was raised to 85° C. and 282 g styrene added. 233 g (1.52 mols) of 94% hydroxypropyl methacrylate were then added the temperature dropping off to 53° C. Over a period of 1 hour, 313 g (0.88 mols) of diphenylmethane diisocyanates Rubinate M were added dropwise the exothermic urethane reaction raising the temperature to 81° C. The temperature was raised to 80°-85° C. and held for 4 hours at which point no detectable amount of free NCO by I.R. analyses was present. 100 ppm of phenothiazine were added followed by 470 g styrene to yield a resin 60% solids in styrene. The resin-styrene solution had a viscosity of 1350 cps (#2 @12) at room temperature. Analysis of the resin-styrene solution gave AN=18.6, SAP=128, and OH=18.

PREPARATION C

Into a two liter reaction flask equipped with a stirrer, thermometer, nitrogen inlet tube and distillation head, there were added 1414 g (4 mols) of polyoxypropylene Bisphenol A containing an average of 2.2 mols of propylene oxide per mol of Bisphenol A and 196 g (2 mols) of maleic anhydride. The resulting mixture was heated to 210°-215° C. and held at that temperature for 5 hours. At this time the acid number had dropped to 11.7. Vacuum was then applied to the reaction mixture of 1 hour while maintaining the temperature at 210°-215° C.

After releasing vacuum, 0.18 g of hydroquinone was added. The resulting hydroxy terminated polyester oligomer was then cooled to 140° C. and poured. The final product was an amber colored semi-solid having an AN=8.9, SAP=142 and OH=155.

EXAMPLE 3

Into a two liter reaction flask equipped with a stirrer, thermometer, dry air inlet tube and distillation head were charged 569 g (0.72 mols) of the hydroxy terminated polyester oligomer described in Preparation C. The temperature was raised to 80° C. and 64 g (0.65 mols) of maleic anhydride added. Temperature was raised to 105°-110° C. and held for ½ hour. 282 g of styrene were then added followed by 211 g (1.35 mols) of 94% hydroxypropyl methacrylate which dropped the temperature to 56° C. Over a period of 1 hour, 283 g (0.8 mols) of Rubinate M were added dropwise the exothermic urethane reaction raising the temperature to 75° C. The temperature was raised to 80°-85° C. and held for 4 hours at which point no detectable amount of free NCO by I.R. analysis was present. 100 Ppm of phenothiazine was added followed by 470 g styrene to yield a resin 60% solids in styrene. The resin styrene solution had a viscosity of 1350 cps (#2 @12) at room temperature. Analysis of the resin styrene solution gave AN=25, SAP=134, and OH=22.

EXAMPLE 4

Into a two liter reaction flask equipped with a stirrer, thermometer, dry air inlet tube and distillation head were charged 797 g (0.91 mols) of the hydroxy terminated polyester oligomer described in Preparation A. The temperature was raised to 98° C. and 282 g styrene then added followed by 174 g (1 mol) of toluene diisocyanate (TDI) were added dropwise the exothermic urethane reaction raising the temperature to 90° C. Thereafter 156 g (1 mol) of 94% hydroxy propylmethacrylate was added. The temperature was held at 90°-95° C. for 3 hours at which point no detectable amount of free NCO by I.R. analysis was present. 100 ppm of phenothiazine were added followed by 470 g styrene to yield a resin 60% solids in styrene. The resin-styrene solution had a viscosity of 625 cps (#2 @30) at room temperature. Analysis of the resin-styrene solution gave AN=31, SAP=156, and OH=12.

EXAMPLE 5

Into a two liter reaction flask equipped with a stirrer, thermometer, dry air inlet tube and distillation head were charged 658 g (0.77 mols) of the hydroxy terminated polyester oligomer described in Preparation B. The temperature was raised to 97° C. and 247 g styrene added followed by 156 g (1 mol) of 94% hydroxypropyl methacrylate which dropped the temperature to 69° C. Over a period of 1 hour 174 g (1 mol) of toluene diisocyanate (TDI) were added dropwise the exothermic urethane reaction raising the temperature to 86° C. The temperature was held at 90°-95° C. for 3½ hours at which point no detectable amount of free NCO by I.R. analysis was present. 100 ppm of phenothiazine were added by 412 g styrene to yield a resin 60% solids in styrene. The resin-styrene solution had a viscosity of 628 cps (#2 @30) at room temperature. Analysis of the resin-styrene solution gave AN=24, SAP=132 and OH=15.

EXAMPLE 6

Into a two liter reaction flask equipped with a stirrer, thermometer, dry air inlet tube and distillation head were charged 605 g (0.77 mols) of the hydroxy terminated polyester oligomer described in Preparation C. The temperature was raised to 80° C. and 53 g (0.54 mols) of maleic anhydride added. Temperature was raised to 105°-110° C. and held for ½ hour. 247 g of styrene were then added followed by 156 g (1.0 mols) of 94% hydroxypropyl methacrylate which dropped the temperature to 58° C. Over a period of 1 hour, 174 g (1 mol) of TDI were added dropwise the exothermic urethane reaction raising the temperature to 78° C. The temperature was raised to 80°–85° C. and held for 4 hours at which point no detectable amount of free NCO by I.R. analysis was present. 100 ppm of phenothiazine were added followed by 412 g styrene to yield a resin 60% solids in styrene. The resin-styrene solution had a viscosity of 632 cps (#2 @30) at room temperature. Analysis of the resin-styrene solution gave AN=25, SAP=150 and OH=18.

EXAMPLE 7

Into a two liter reaction flask equipped with a stirrer, thermometer, dry air inlet tube and distillation head were charged 658 g (0.77 mols) of the hydroxy terminated polyester oligomer described in Preparation B. The temperature was raised to 80° C. and 156 g (1 mol) of 94% hydroxypropyl methacrylate added. Over a period of ½ hour, 174 g (1 L mol) of TDI were added dropwise the exothermic urethane reaction raising the temperature to 108° C. The temperature was raised to 110°–115° C. and held for 1 hour. At this point no detectable amount of free NCO by I.R. analysis was present. The molten resin was poured and on cooling was an amber solid with a melting point of 82° C. (Ball and Ring) and analyzed AN=40, SAP=241 and OH=25.

Although these resins were designed for sheet molding applications, casting and laminate data were obtained to establish their physical properties as cured styrene copolymers.

TABLE 1

Cure System 1.0% DDM-0.4% Co Naphthenate

| Resin | Ex. 1 | Ex. 4 | Ex. 5 |
|---|---|---|---|
| Flex Str (psi) | 24,200 | 19,300 | 22,300 |
| Flex Mod ($10^6$ psi) | 0.52 | 0.53 | 0.52 |
| Tens Str (psi) | 10,310 | 11,100 | 10,600 |
| Tens Mod ($10^6$ psi) | 0.52 | 0.51 | 0.53 |
| % Elongation | 2.71 | 2.59 | 2.39 |
| HDT °C. | 120 | 107 | 108.5 |
| Charpy Impact | 6.1 | 4.9 | 6.5 |
| Barcol Hardness | 40–45 | 37–41 | 40–42 |
| Laminate ⅛" | | | |
| Flex Str (psi) | 18,000 | 16,400 | 14,700 |
| Flex Mod ($10^6$ psi) | 0.91 | 0.82 | 0.90 |
| Tens Str (psi) | 12,920 | 9,300 | 11,800 |
| Tens Mod ($10^6$ psi) | 1.16 | 1.48 | 1.20 |
| % Elongation | 1.45 | 1.2 | 1.10 |
| Notched Izod | 3.02 | 5.15 | 4.29 |
| Barcol Hardness | 41–48 | 44–45 | 44–49 |
| % Flex Strength Retention | | | |
| 200° F. | 19,700 | | |
| 250° F. | 16,100 | | |
| 300° F. | 3,400 | | |

Physical properties for both TDI and MDI based COOH modified VMU resins are superior to commercially available isophthalic polyester and to the Dow Derakane ® automotive resin. The Rubinate M resins are better than the TDI based resins and have higher viscosity in styrene which can be advantageous for sheet molding compound manufacture.

TABLE 2

Typical thickening characteristics of these resins with MgO are shown below

| | TDI Based Resins | | | MDI Based Resin |
|---|---|---|---|---|
| AN | 19.8 | 23.7 | 30.8 | 24 |
| % MgO | 5 | 5 | 5 | 4 |
| % H$_2$O | 15 | .5 | .5 | 0.5 |
| 0 Hrs | 3920* cps | 2464 | 2800 | 3350 |
| 1 Hrs | 23,800 | — | 47,600 | 126,000 |

TABLE 2-continued

Typical thickening characteristics of these resins with MgO are shown below

| | TDI Based Resins | | | MDI Based Resin |
|---|---|---|---|---|
| 2 Hrs | 52,640 | 128,800 | 344,400 | 250,000 |
| 3 Hrs | 61,600 | 154,000 | 336,000 | 332,000 |
| 6 Hrs | 142,800 | 291,200 | 739,000 | — |
| 24 Hrs | 828,000 | 2,856,000 | 6,272,000 | 3,648,000 |
| 48 Hrs | 1,960,000 | 5,264,000 | off scale | off scale |
| 72 Hrs | 2,688,00 | 8,288,000 | " | " |

*Brookfield HST Viscometer

What is claimed is:

1. A sheet molding composition comprising from 10–60 percent by weight of an ethylenically unsaturated monomer selected from the group consisting of styrene, chlorostyrene, t-butylstyrene, divinylbenzene, vinyltoluene, vinylacetate, vinylpropionate, acrylic acid, methacrylic acid esters and substituted acrylic acid esters, diallylphthalate, diallylfumarate, triallylcyanurate and trivinylisocyanurate, and a carboxy terminated vinyl ester urethane polymer having the general formula:

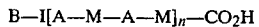

B—I[A—M—A—M]$_n$—CO$_2$H wherein
B is a radical derived from a hydroxyl-terminated ester of acrylic or methacrylic acid;
I is a radical derived from an aromatic polyisocyanate;
A is a radical derived from a polyoxyalkylene bisphenol A or derivative thereof;
M is a radical derived from a dicarboxyli acid or anhydride thereof;
n is an integer equal to from 1 to about 10.

2. A composition of claim 1 wherein I is selected from the group consisting of toluene diisocyanate, diphenylmethane diisocyanate and methylene bridged diphenylmethane diisocyanate.

3. A composition of claim 1 wherein A has the general formula:

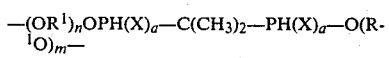

—(OR$^1$)$_n$OPH(X)$_a$—C(CH$_3$)$_2$—PH(X)$_a$—O(R$^1$O)$_m$— wherein
R$^1$ is an alkylene group having 2–4 C atoms;
PH is a phenyl radical;
X is halogen or methyl;
(n) and (m) are integers each of which is equal to at least 1 of the sum of which is equal from 2–16; and
(a) is an integer of 0 to 2.

4. A composition of claim 1 wherein M is derived from the group consisting of fumaric and maleic acid.

5. A thickened composition of claim 1 further comprising from 0.5 to 10% by weight of a carboxy reactive thickening agent selected from the group consisting of magnesium oxide, calcium oxide, magnesium hydroxide, calcium hydroxide and basic magnesium carbonate and an equivalent amount of water.

6. A composition of claim 5 further comprising a free radical generating catalyst, a filler and a reinforcing agent.

7. A resin composition of claim 6 fully cured by the activation of said free radical catalyst.

8. A composition of claim 1 further comprising from 5–60% by weight of an ethylenically unsaturated resin selected from the group consisting of a polyester resin, a polyurethane resin and a polyvinyl isocyanurate resin.

9. A composition of claim 1 having an acid number in the range of 12–33.

* * * * *